Oct. 14, 1969    J. BRUIN ET AL    3,472,344

DOUBLE CHAMBER SINGLE PISTON HYDRAULIC ACTUATING DEVICE

Filed June 3, 1968

INVENTORS
JAMES BRUIN
CLYDE O DAMITZ
BY
John R. Faulkner
Clifford L. Sadler
ATTORNEYS 3,472,344
DOUBLE CHAMBER SINGLE PISTON HYDRAULIC
ACTUATING DEVICE
James Bruin, Rochester, and Clyde O. Damitz, Southfield, Mich., assignors to Ford Motor Company, Dearborn, Mich., a corporation of Delaware
Filed June 3, 1968, Ser. No. 733,873
Int. Cl. F16d 65/16; B60t 11/24
U.S. Cl. 188—152                        4 Claims

ABSTRACT OF THE DISCLOSURE

A hydraulic actuating device for a caliper-type disc brake having a single, cup-shaped piston operable by two mutually independent fluid systems. A cylindrical element is secured to the caliper housing and is slidably received within the cup-shaped piston. The cylindrical element is formed independently of the caliper housing permitting it to be secured to a conventional caliper to provide dual fluid systems.

BACKGROUND OF THE INVENTION

In an automotive hydraulic braking system utilizing a single pressure system to actuate a brake unit, failure of the pressure system will result in complete loss of the braking ability of that unit. A complete loss of braking ability may be prevented, however, by providing two separate hydraulic pressure supplies to each brake unit. Such a dual pressure system may be provided by a conventional dual master cylinder.

Double pressure system disc brake units have been proposed which utilize a pair of pistons acting in parallel. Such constructions are both bulky and costly as compared with the invention to be described herein.

This invention provides a hydraulic actuating device having a single, cup-shaped piston operable by two mutually independent fluid systems. The brake unit is economical to construct and may be used within existing package limitations of presently known disc brake units.

BRIEF SUMMARY OF THE INVENTION

A hydraulic actuating device constructed in accordance with this invention includes a housing having an open end cylindrical bore formed therein. A cylindrical member having a diameter less than that of the housing bore extends concentrically from the closed end of the bore toward the open end. A piston means having a blind bore formed concentrically therein is slidingly received within the housing bore and about the cylindrical member.

A generally annularly shaped pressure chamber is formed between the housing and the piston and is defined in part by a portion of the housing bore and a wall portion of the cylindrical member. A generally cylindrically shaped pressure chamber is formed between the housing and the piston and is defined in part by a portion of the piston bore and an end portion of the cylindrical member. The annularly shaped pressure chamber is independent of the cylindrically shaped chamber.

The piston is axially movable with the housing bore in response to fluid pressure within the chambers.

DETAILED DESCRIPTION OF THE INVENTION

Figure 1:
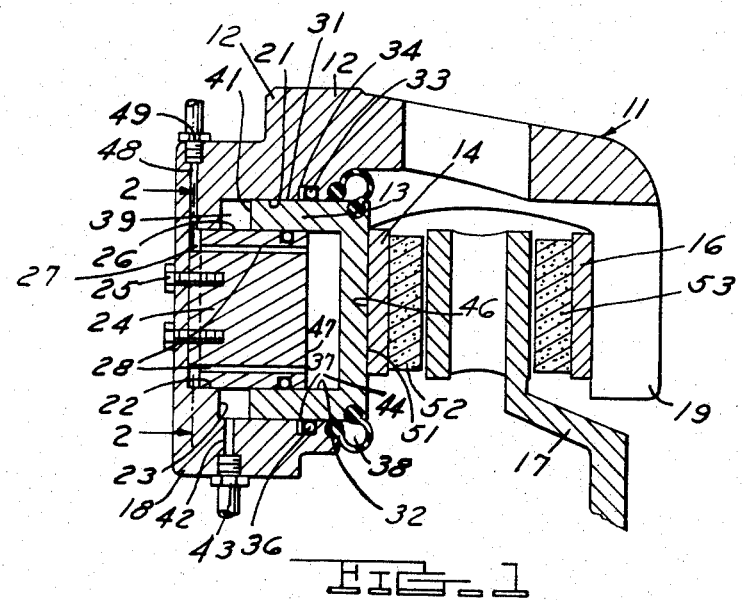
FIGURE 1 shows a cross-section of a portion of a disc brake assembly embodying the invention.
Figure 2:
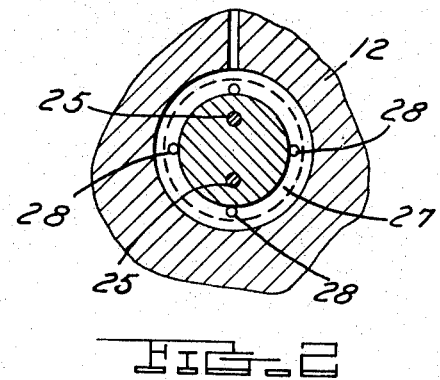
FIGURE 2 is a cross-section of section 2—2 as shown in FIGURE 1.

FIGURE 1 illustrates a hydraulically actuated floating caliper assembly 11 for a disc brake unit. The assembly 11 includes a caliper housing 12, a piston 13 and brake shoes 14 and 16. A rotor 17, not a part of the floating caliper assembly 11, is also shown in FIGURE 1.

The caliper housing 12 has two downwardly extending legs, an inboard leg 18 and an outboard leg 19. A bore 21 is formed in inboard leg 18 which opens toward outboard leg 19. A cylindrical recess 22 having a smaller diameter than bore 21 is formed within base 23 of bore 21. Received within and extending from recess 22 into bore 21 is a cylindrical member 24. Member 24 may be rigidly secured within recess 22 by capscrews 25 or other suitable fastening means. Cylindrical wall surface 26 of member 24 and bore 21 are coaxial. A portion is removed from the cylindrical member 24 to form an annular channel 27 between the housing 12 and the member 24. A number of passages 28 lead from channel 27 and extend axially through member 24.

A generally cup-shaped piston 13 having an outer cylindrical wall surface 31 coaxial with an inner cylindrical bore 32 is slidingly received within bore 21. The wall of bore 32 slidingly engages member 24. A first seal 33 is received in groove 34 of housing 12 and sealingly engages surface 31 of piston 29. A second seal 36 is received in groove 37 and sealing engages the wall of bore 32 of piston 29. An annular dust boot 38 is secured to housing 12 and piston 29 and prevents dirt from entering the opening of bore 21.

Conventional air bleed valves (not shown) may be installed in communication with the pressure chambers 39 and 44.

A first pressure chamber 39 of annular shape is defined by bore 21, outer wall 26 of member 24, base 23 of bore 21 and annular surface 41 of piston 13. Passage 42 and transfer tube 43 connect chamber 39 and a first hydraulic pressure source (not shown). A second pressure chamber 44, independent from chamber 39, is defined by bore 32 and end 46 of piston 13, and end 47 of cylindrical member 24. Chamber 44 is connected to a second hydraulic pressure source (not shown) by way of passages 28, channel 27, passage 48 and transfer tube 49.

Annular chamber 39 and chamber 44 are coaxial and exert balanced forces upon the piston 13 when the two chambers are pressurized with hydraulic fluid.

Mounted to the protruding end 51 of piston 13 is the brake shoe 14, movable with piston 13 in response to fluid pressures within the chambers 39 and 44. Shoe 14 includes a bonded lining portion 52 which is engageable with rotor 17. The second brake shoe 16 is mounted to the outboard leg 19 of floating caliper housing 12. Shoe 16 also includes a bonded lining portion 53 engageable with rotor 17.

OPERATION

The two mutually independent pressure chambers 39 and 44 each contact a separate portion of piston 13. During normal braking operation both chambers are pressurized by a conventional dual master cylinder (not shown) causing piston 13 to move rightwardly. In the event that one of the hydraulic transfer lines 43 or 49 from the master cylinder should fail, the remaining pressure system would be unaffected and would continue to pressurize its corresponding pressure chamber.

Because the chambers 39 and 44 are coaxial, the alignment of the force exerted upon the brake shoe 14 in the event there is a loss of pressure in one of the chambers will be the same as when both chambers are functioning. Therefore, operation of the brake of FIGURE 1 by only one cylinder will not cause the brake shoe to cant or produce erratic braking. Another obvious advantage of the present arrangement is the fact that a redundant hydraulic system is provided in a brake caliper having but a single piston and a single machined bore in the housing.

In summary, it may be seen that the invention described herein provides a dual system brake actuating device utilizing a single piston which may be used within conventional package limitations.

The foregoing description presents the presently preferred embodiment of the invention. Modifications and alterations will occur to those skilled in the art that are included within the scope and the spirit of the invention.

We claim:
1. A hydraulic actuating device including:
    a housing,
    a first cylindrical bore formed within said housing having an open end and a closed end,
    a cylindrical member having one end abutting said closed end of said first bore,
    fastening means to secure said cylindrical member to said housing,
        said cylindrical member having a diameter less than that of said first bore and extending concentrically from the closed end of said first bore toward the open end of said first bore,
    a cylindrical recess formed concentrically in the closed end of said first bore and receiving a portion of said cylindrical member,
    a piston slidingly received in said first bore,
        said piston being formed with a second cylindrical bore and having an open end and a closed end, said cylindrical member extending into and slidingly engaging said second bore,
    a first pressure chamber between said housing and said piston defined in part by a portion of said first bore and the wall portion of said cylindrical member,
    a second pressure chamber between said housing and said piston defined in part by a portion of said second bore and an end portion of said cylindrical member,
        said piston axially movable within said first bore in response to fluid pressures within said chambers,
        said first chamber being independent of said second chamber.
2. A hydraulic actuating device according to claim 1 and including:
    the diameter of said first bore being approximately equal to the diameter of said piston,
    the diameter of said second bore being approximately equal to the diameter of said cylindrical member.
3. A hydraulic actuating device according to claim 1 comprising a portion of a disc brake unit,
    said housing comprising a caliper assembly,
    the first passage means leading from said first pressure chamber to the exterior of said housing,
    second passage means leading from said second pressure chamber through said cylindrical member to the exterior of said housing, said cylindrical member including a reduced diameter portion forming an annular recess, said reduced diameter portion being received within said cylindrical recess, said annular recess comprising a portion of said second passage means.
4. A hydraulic actuating device according to claim 1 and including:
    seal means received in said housing slidingly engaging said piston.

References Cited
UNITED STATES PATENTS
3,251,436    5/1966    Afanador et al.

FOREIGN PATENTS
997,933    9/1951    France.
951,906    3/1954    Great Britain.

GEORGE E. A. HALVOSA, Primary Examiner

U.S. Cl. X.R.

92—110; 188—106